United States Patent Office 3,475,407
Patented Oct. 28, 1969

3,475,407
PROCESS FOR PREPARING 7(R)- AND 7(S)-HALOLINCOMYCINS
Robert D. Birkenmeyer, Comstock Township, Kalamazoo County, Mich., assignor to The Upjohn Company, Kalamazoo, Mich., a corporation of Delaware
No Drawing. Filed Dec. 22, 1967, Ser. No. 692,728
Int. Cl. C07c 47/18
U.S. Cl. 260—210   7 Claims

ABSTRACT OF THE DISCLOSURE

Compounds of the formula:

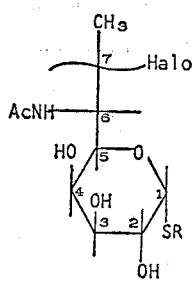

I as well as esters and ethers thereof are prepared by replacing by halogen, e.g., chlorine, bromine, and iodine, the 7-hydroxy of a compound of the formula

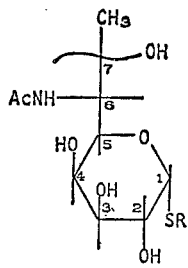

II

The replacement is effected by mixing the starting compound of Formula II with triphenylphosphine and carbon tetrahalide in an inert solvent. Any or all of the 2-, 3-, or 4-hydroxyl groups can be esterified or covered by protective groups, either before or after the replacement of the 7-hydroxy group.

Cross references to related applications

In application Ser. No. 498,989, now abandoned in which I am a co-inventor, there is described a process in which 7-chloro- or 7-bromo-7-deoxylincomycin is obtained by reacting lincomycin with a Rydon reagent. In that process, for example, chlorine or bromine is reacted with triphenyl phosphine to form triphenylphosphine dihalide, a Rydon reagent.

In that process, iodine cannot be substituted for the chlorine or bromine. In other words, 7-iodo-7-deoxylincomycin cannot be prepared by that process. The process of this invention, therefore, has the unique advantage of being useful in producing new compounds. Moreover, substantially improved yields of 7-chloro- and 7-bromo-7-deoxylincomycins are obtained by the process of the invention.

Brief summary of invention

This invention relates to a novel process and is particularly directed to a process for preparing compounds of the formula:

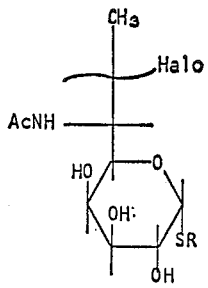

I as well as esters and ethers thereof by replacing by halogen, e.g., chlorine, bromine, and iodine, the 7-hydroxy of a compound of the formula

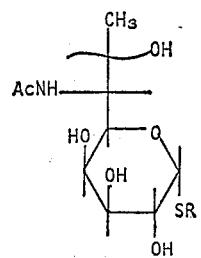

II

The replacement is effected by mixing the starting compound of Formula II with triphenyl phosphine and carbon tetrahalide in an inert solvent. In the process Ac can be hydrogen or acyl and R the radical of a mercaptan. Advantageously, both Ac and R are non-reactive with the triphenylphosphine-carbontetrahalide reagents. Preferably R is alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms; and Ac is hydrogen or an acyl radical, advantageously the aryl radical of a 4-substituted-L-2-pyrrolidinecarboxylic acid of the formula

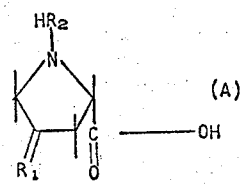 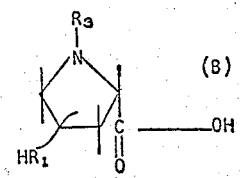

wherein $R_1$ and $R_2$ are alkylidene of not more than 20 carbon atoms (including methylene), advantageously not more than 8 carbon atoms, cycloalkylidene of from 3 to not more than 8 carbon atoms, and aralylidene of not more than 12 carbon atoms, advantageously not more than 8 carbon atoms; and $R_3$ is hydrogen or $HR_2$. Ac can also be an acyl radical of a 4-substituted-L-2-pyrrolidine-carboxylic acid of the formula

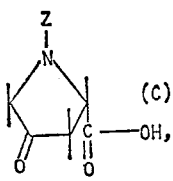 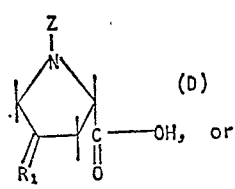 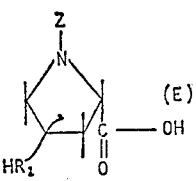

wherein Z is a protective group which can be removed by hydrogenolysis or solvolysis.

Examples of alkyl of not more than 20 carbon atoms (R, $HR_1$, and $HR_2$) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl. Exampes of aralkyl are benzyl, phenethyl, 3-phenylpropyl, and 1-naphthylmethyl. Examples of alkylidene, cycloalkylidene, and aralkylidene groups ($R_1$ and $R_2$) include methylene, ethylidene, propylidene, butylidene, pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and 1-naphthylmethylene.

The $HR_1$-group can be in either the cis or trans position as illustrated in the following formulas

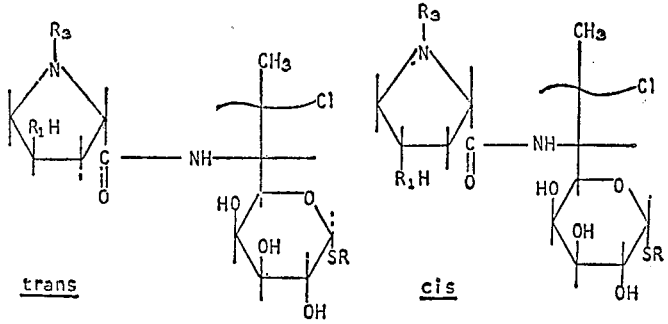

If desired, the cis and trans isomers can be separated by counter current distribution or chromatography either before or after replacement of the 7-hydroxy group by halogen.

When $R_3$ in Formulas B, IB, and IIB is hydrogen (Formulas IB and IIB are, respectively, Formulas I and II wherein Ac is the acyl of acid B), it can be replaced by suitable alkylation or like procedure. Advantageously, this replacement is effected by reacting the compound according to Formula B, IB, or IIB, wherein $R_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula $R_4R_5CO$ where $R_4R_5C=$ is the same as $R_2$ given above. Examples of suitable oxo compounds are formaldehyde, acetaldehyde, propionaldehyde, butyraldehyde, acetone, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopethanepropionaldehyde, cyclohexaneacetaldehyde, cycloheptanecarboxaldehyde, 2,2 - dimethylcyclopropylacetaldehyde, 2,2-dimethylcyclopropyl methyl ketone, cyclopentyl methyl ketone, cyclobutyl methyl ketone, cyclobutanone, cyclohexanone, 4-methylcyclohexanone, and the like.

Detailed description

The starting compounds of Formula II wherein Ac is acyl are prepared by acylating a compound of the formula

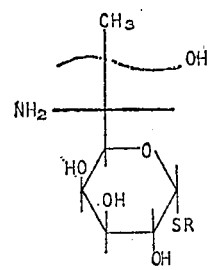

V wherein R is as given above, with a 4-substituted-L-2-pyrrolidinecarboxylic acid of Formula A or B. This acylation and like acylations referred to herein can be effected by procedures already well known in the art for acylating amino sugars.

The starting acid of Formula A can be prepared by reacting a 4-oxo compound of the formula

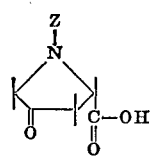

C wherein Z is a protective group which is removable by hydrogenolysis or solvolysis with a Wittig agent, e.g., an alkylidenetriphenylphosphorane [see e.g., Wittig et al., Ber., 87, 1348 (1954); Trippett, Quarterly Reviews, XVII, No. 4, p. 406 (1963)]. Suitable such groups are trityl (i.e., triphenylmethyl), diphenyl (p-methoxyphenyl)methyl, bis-(p-methoxyphenyl)phenylmethyl, benzyl, or p-nitrobenzyl, and hydrocarbyloxycarbonyl groups. Examples of the latter are tertiary-butoxycarbonyl; benzyloxycarbonyl groups of the formula

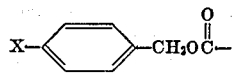

wherein X is hydrogen, nitro, methoxy, chloro, or bromo, for example, carbobenzoxy, n-nitrocarbobenzoxy, p-bromo-, and p-chlorocarbobenzoxy; and phenyloxycarbonyl groups of the formula

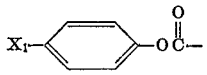

wherein $X_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

In carrying out this process the 4-oxo-L-2-pyrrolidinecarboxylic acid (Formula C) is added to a freshly prepared Wittig reagent. The Wittig reagents herein used can be generally represented by the following formula:

$$R_1 = P(C_6H_5)_3$$

wherein $R_1$ is as given above. These Wittig reagents are prepared by reacting an alkyl, cycloalkyl, or aralkyltriphenylphosphonium halide with a base such as sodamide, or sodium or potassium hydride, or the sodium or potassium metalate of dimethyl sulfoxide and the like. For example, the elimination of hydrogen halide from alkyltriphenyl phosphonium halide, produces alkylidenetriphenylphosphorane. [The preparation of phosphoranes is discussed in detail by Trippett, Quart. Rev. XVII, No. 4, p. 406 (1963)]. The reaction is generally carried out in an organic solvent, such as benzene, toluene, ether, dimethylsulfoxide, tetrahydrofuran, or the like, at temperatures between 10° C. and the reflux temperature of the reaction mixture. The thus-obtained product, a 4-alkylidene-, 4-cycloalkylidene-, or 4 - aralkylidene-1-protected-L-proline which has the following formula

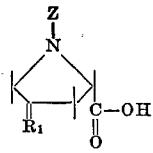

D is recovered from the reaction mixture in a conventional manner, generally by extraction from aqueous solutions of the reaction mixture. The crude product can be purified by conventional means, such as recrystallization, chromatography, or formation and recrystallization of easily formed derivatives such as amine salts of the amino acid, e.g., the dicyclohexylamine salt, and the like, and liberating the amino acids from such compounds. By hydrogenating an acid of Formula D in the presence of a catalyst, e.g., platinum, which is effective to saturate a double bond, but which is ineffective to effect hydrogenolysis, a compound of the following formula

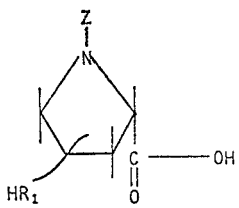

E is obtain. Platinum deposited on a carrier, e.g., carbon or anion exchange resin like Dowex-1, a cross-linked polystyrene trimethylbenzylammonium resin in the hydroxide cycle is suitable. If desired, the starting compounds of Formula V can be acylated with acids of Formulas C, D, or E to form compounds IIC, IID, and IIE, respectively. Compound IIC can then be converted to compound IID by treatment with a Wittig reagent and compound IID hydrogenated to compound IIE by the procedures given above. The hydrogenation, both of the acid D and the acylate IID, gives a mixture of cis and trans isomers which, if desired, can be separated by counter current distribution or chromatography. The starting acids of Formula B in which $R_3$ is hydrogen are obtained when an acid of Formula D or E is subjected to hydrogenolysis over a palladium catalyst, e.g., palladium on carbon. Likewise, compounds of Formula IID and IIE are converted to compounds of Formula IIB in which $R_3$ is hydrogen by the same process. The starting acids of Formula B in which $R_3$ is hydrogen as well as compounds of Formula IIB in which $R_3$ is hydrogen can be converted respectively to compounds of Formulas B and IIB in which $R_3$ is $HR_2$ by the procedures given above. The starting acids of Formula A or Formula B are obtained by treating an acid of Formula D or Formula E with hydrogen bromide in acetic acid to remove the Z group and then replacing the N-hydrogen with an $HR_2$ group by the procedure given above. Compounds of Formulas IID and IIE are converted to compounds of Formulas IIA and IIB, respectively, by the same process.

Some of the starting compounds of Formula II are obtained biosynthetically. Lincomycin, methyl 6,8 - dideoxy - 6-(trans-1-methyl-4-propyl - L-2-pyrrolidinecarboxamido) - 1 - thio - D - erythro - α - D - galacto-octopyranoside, is obtained as an elaboration product of a lincomycin-producing actinomycete according to U.S. Patent 3,086,912. It has the following structural formula:

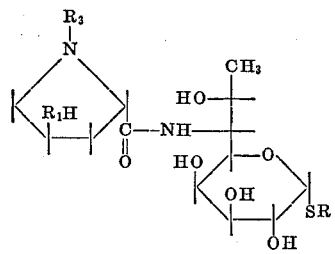

VI wherein R and $R_3$ are methyl and $R_1H$ is propyl. Lincomycin B, methyl 6,8-dideoxy - 6 - (trans-1-methyl-4-ethyl-L-2-pyrrolidinecarboxamido) - 1 - thio - D-erythro-α-D-galacto-octopyranoside (Formula VI wherein R and $R_3$ are methyl and —$R_1H$ is ethyl) also is an elaboration product of the same microorganism when cultured according to the procedure given in U.S. Patent 3,086,912. Lincomycin C (S-ethyl-S-demethyllincomycin), ethyl 6,8-dideoxy-6 - (trans-1-methyl - 4 - propyl - L-2-pyrrolidinecarboxamido) - 1-thio - D - erythro - α-D-galacto-octopyranoside (Formula VI wherein R is ethyl, —$R_1H$ is propyl, and $R_3$ is methyl) is obtained when the process of U.S. Patent 3,086,912 is carried out in the presence of added ethionine. Lincomycin D, methyl 6,8-dideoxy-6-(trans - 4 - propyl - L - 2 - pyrrolidinecarboxamido)-1-thio-D-erythro-α-D-galacto-octopyranoside (Formula VI wherein R is methyl, —$R_1H$ is propyl, and $R_3$ is hydrogen) is obtained when the fermentation of U.S. Patent 3,086,912 is carried out in the presence of added α-MTL (methyl α-thiolincosaminide), methyl 6 - amino - 6,8-dideoxy - D - erythro - 1 - thio-α-D-galacto-octopyranoside, a compound obtained by the hydrazinolysis of lincomycin according to U.S. Patent 3,179,595. N-dimethyllincomycin B, methyl 6,8-dideoxy-6-(trans-4-ethyl-L-2-pyrrolidinecarboxamido) - 1 - thio - D - erythro - α - D-galacto-octopyranoside (Formula VI wherein R is methyl, —$R_1H$ is ethyl and $R_3$ is hydrogen) is also produced when α-MLT is added to the fermentation of U.S. Patent 3,086,912. Similarly, lincomycin K, ethyl 6,8-dideoxy-6-(trans - 4 - propyl - L - 2 - pyroolidinecarboxamido)-1-thio - D - erythro - α - D - galacto-octopyranoside (Formula VI wherein R is ethyl, —$R_1H$ is propyl, and $R_3$ is hydrogen) is produced when the fermentation of U.S. Patent 3,086,912 is carried out in the presence of added α-ETL (ethyl α-thiolincosaminide), ethyl 6 - amino-6,8-dideoxy-1-thio - D - erythro - α - D - glacto-octopyranoside, a compound obtained by the hydrazinolysis of lincomycin C. (S - ethyl - S,N-didemethyllincomycin B), ethyl 6,8-dideoxy - 6 - (trans - 4 - ethyl-L-2-pyrrolidine-carboxamido) - 1 - thio - D - erythro - α - D - galacto-octopyranoside (Formula VI wherein R is ethyl, —$R_1H$ is ethyl, and $R_3$ is hydrogen) is also obtained when α-ETL is added to the fermentation of U.S. Patent 3,086,912. The above-described N - desmethyl products which are obtained when α-MTL and α-ETL are added to the fermentation process of U.S. Patent 3,086,812 are examples of compound IIB wherein $R_3$ is hydrogen. By the procedure described above replacement of the N-hydrogens produces compounds of Formula IIB wherein $R_3$ equals $HR_2$, e.g., methyl 6-8-dideoxy - 6 - (trans - 1-ethyl - 4 - propyl - L - 2 - pyrrolidinecarboxamido) - 1-thio - D - erythro - α - D - galacto-octopyranoside, ethyl 6,8 - dideoxy - 6 - (trans - 1 - methyl - 4 - ethyl - L - 2-pyrrolidinecarboxamido) - 1 - thio - D - erythro - α - D-galacto-octopyranoside, ethyl 6,8-dideoxy - 6 - (trans-1-ethyl - 4 - ethyl - L - 2 - pyrrolidinecarboxamido) - 1-thio - D - erythro - α - D - galacto-octopyranoside, and methyl 6,8-dideoxy - 6 - (trans - 1 - ethyl - 4 - ethyl - L-2 - pyrrolidinecarboxamido) - 1 - thio - D - erythro - α-D - galacto-octopyranoside.

Lincomycin or any of the starting compounds of Formula II which has the D-erythro configuration can be converted to the L-threo configuration by oxidizing the 7-hydroxy group to a 7-oxo group and reducing the latter For example, licomycin on treatment with acetone in the presence of p-toluenesulfonic acid is converted to 3,4-O-isopropylidenelicomycin which on oxidation with chromic oxide gives 7-dehydro-3,4-O-isopropylidenelincompcin, methyl 6,8 - dideoxy - 3,4-O-isopropylidene-6-(trans-1-methyl - 4 - propyl-L-2-pyrrolidinecarboxamido)-1-thio-D-glycero-α-D-galacto-octanopyranos-7-uloside, which on treatment with sodium borohydride is converted to 7-epilincomycin, methyl 6,8-dideoxy-6-(trans-1-methyl-4-propyl-L-2-pyrrolidinecarboxamido)-1-thio-L - threo-α-D-galacto-octopyranoside. Any of the starting compounds of Formula II having a D-erythro configuration can be converted to the corresponding L-threo configuration by this procedure.

As the biosynthetic-produced lincomycins, as well as the amino sugars derived therefrom, are either methyl or ethyl thioglycosides, it is sometimes desirable to convert them to higher or lower glycosides. It is also sometimes desirable to convert any of the compounds of Formulas I, II or V to higher or lower glycosides. This can effectively be accomplished by reacting the compound with a mercaptan of the formula $R_6SH$ wherein $R_6$ is an alkyl group of not more than 20 carbon atoms, but one different from R and cyclizing the resulting dimercaptal. For example, compounds of Formulas I and II on reaction with a mercaptan of Formula $R_6SH$ produce dithioacetals of the formula

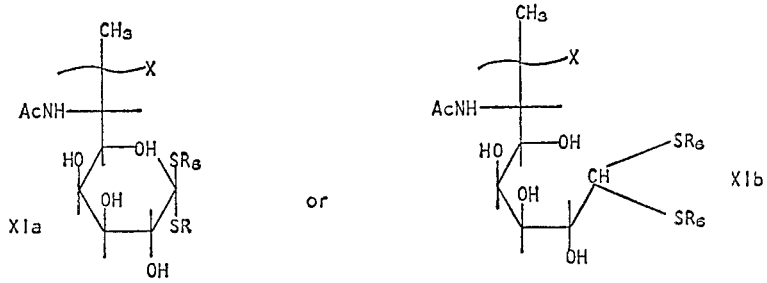

to a 7-hydroxy group. A suitable procedure for this purpose is illustrated in the following sequence:

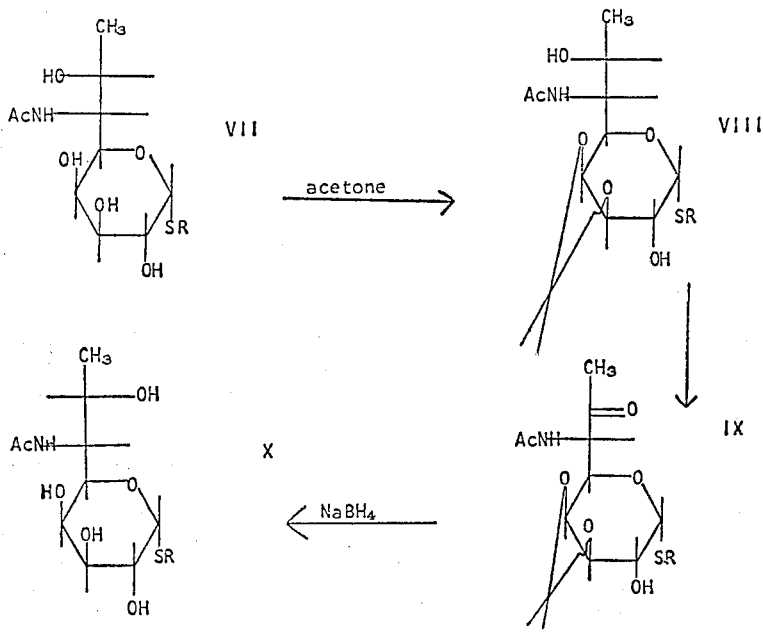

wherein X is hydroxy or chlorine, which on treatment with acid or on heating, either in the presence of acid or not, are recycled to a compound of the following formula:

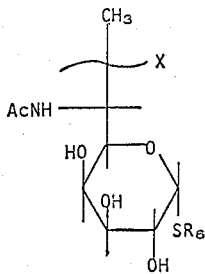

XII

The process can be applied directly to any of the starting products of Formula II, i.e. IIA, IIB, IIC, IID, and IIE. The resulting products can be subjected to hydrazinolysis to form compounds of the following formula:

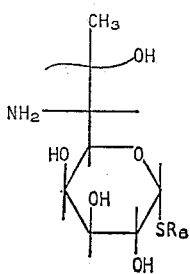

XIII which can be N-acylated as described above with acids of Formula A, B, C, D, and E to provide compounds according to Formula XII wherein X is hydroxy. The process can also be applied to the starting compounds of Formula V. For example, α-MTL on treatment with ethyl mercaptan followed by cyclization as described above is converted to α-ETL.

An alternative process for making compounds of Formula XII or Formula XIII is to brominate the starting material (Formulas I, II, or V) and then react the product with a mercaptan according to the following sequence:

The starting compound, XIV, is dissolved in water as a soluble salt, e.g., the hydrochloride, and bromine added with cooling advantageously to between about −10 and 20° C. It is sufficient if the aqueous solution is cooled to about 0° C. and the bromine added dropwise. The stoichiometric amount of bromine is 1 mole for each mole of starting compound, though more or less can be used. Advantageously a slight excess, say from 5 to 20% excess, of bromine is used. The bromine initially replaces the RS— group and the resulting intermediate hydrolizes to the sugar in which the pyranose form XVa is in equilibrium with the aldose form XVb. In the presence of acid, e.g., hydrochloric acid or other strong non-oxidizing acid such as p-toluenesulfonic acid and sulfonic acid type anion exchange resins, the mercaptan $R_6SH$ reacts with the sugar to form the thioglycoside XVII. Concomitantly some diacetal may be formed which after separation can be cyclized as described above to form more of the desired thioglycoside XVI.

The mechanism by which the triphenylphosphine-carbontetrahalide effects the substitution of the 7-hydroxy by halogen is not fully understood. The mechanism is such that a change in configuration results. Thus, a 7-hydroxy compound of the D-erythro configuration yields a 7(S)-chloro compound of the L-threo configuration. For example, 7(S)-chloro-7-deoxylincomycin which is derived from lincomycin (lincomycin has the D-erythro configuration), has the L-threo configuration.

The process is simple. All that is required is to combine the reagents in an inert solvent. The reaction procedes well at room temperature (25° C.) but gentle heating, say to a reflux temperature of 50–60° C. can be used. In some cases, the reagent carbontetrachloride or carbontetrabromide is adequate as the solvent if an excess is used. In others as with carbontetraiodide, or when acid addition salts of the starting lincomycin compounds are used, a more polar solvent is needed. Suitable such more polar solvents are acetonitrile and nitrobenzene. The triphenylphosphine and the carbontetrahalide are optimally used in equimolar proportions, though an excess of carbontetrahalide may be used, if desired. An excess of the triphenylphosphine-carbontetrahalide reagent is desirable. Optimally 4 moles of triphenylphosphine and 4 or more moles of carbontetrahalide are used for each mole of starting compound.

Any or all of the 2-, 3-, and 4-hydroxy groups can be

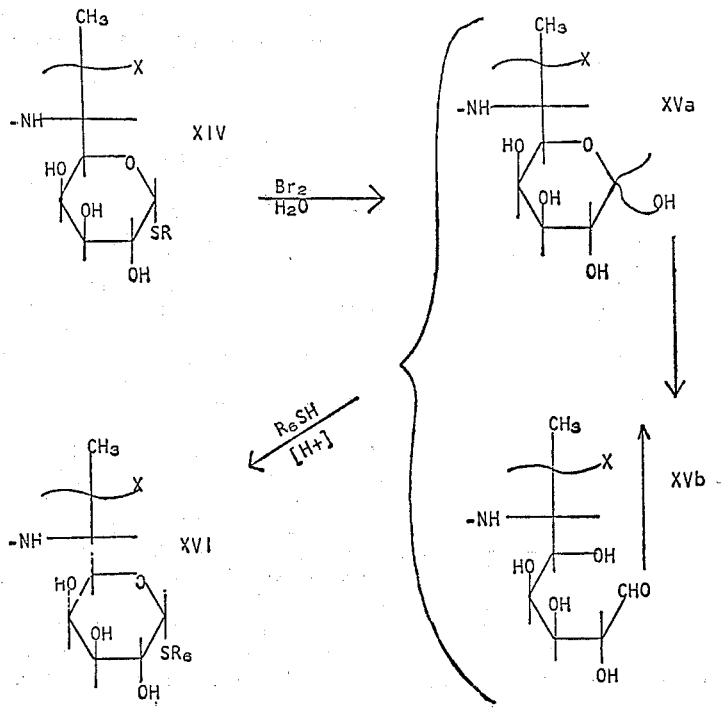

esterified either before or after the chlorination with hydrocarbon carboxylic acids, advantageously of not more than 18 carbon atoms, or halo-, nitro- hydroxy-, amino-, cyano-, thiocyano-, or alkoxy- substituted hydrocarbon carboxylic acids, advantageously also of not more than 18 carbon atoms.

Examples of carboxylic acid acyl radicals are the acyl radicals of the following acids: (a) saturated or unsaturated, straight or branched chain aliphatic carboxylic acids, for example acetic, propionic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipopyl cyclohexane carboxylic acid, and the like; (c) saturated or unsaturated, alicyclic aliphatic carboxylic acids, for example, cyclopentaneacetic acid, cyclopentanepropionic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and alkoxy-substituted hydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dedocyloxy, hexadecyloxy, and isomeric forms thereof. Example of such substituted hydrocarbon carboxylic acids are mono-, di-, and trichloracetic acid; $\alpha$- and $\beta$-chloropropionic acid; $\alpha$- and $\gamma$-bromobutyric acid; $\alpha$- and $\beta$-iodovaleric acid; mevalonic acid; 2- and 4-chlorocyclohexanecarboxylic acid; shikimic acid; 2-nitro-1-methyl-cyclobutanecarboxylic acid; 1,2,3,4,5,6-hexachlorocyclohexanecarboxylic acid; 3 - bromo - 2 - methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4,5-dibromo-2-methylcyclohexanecarboxylic acid; 5, 6-dibromo-2-methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1-bromo-3,5-dimethylcyclohexanecarboxylic acid; homogentisic acid, o-, m-, and p-chlorobenzoic acid; anisic acid; salicyclic acid; p-hydroxybenzoic acid; $\beta$-resorcylic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5 dinitrobenzoic acid 2,4,6-trinitrobenzoic acid; thiocyanoacetic acid; cyanopropionic acid; and lactic acid. Examples of such alkoxyhydrocarbon carboxylic acids are ethoxyformic acid (ethyl hydrogen carbonate); butyloxyformic acid, pentyloxyformic acid; hexyloxyformic acid; dodecyloxyformic acid; hexadecyloxyformic acid, and the like.

Any or all of the 2-, 3-, and 4-hydroxy groups can also be etherified, for example with alkyl, advantageously of not more than 20 carbon atoms; cycloalkyl, advantageously of from 3 to not more than 8 carbon atoms; aralkyl, advantageously of not more than 12 carbon atoms; or ylidene (e.g., 3,4-O-ylidene) group, for example, alkylidene, advantageously of not more than 20 carbon atoms and aramethylidene and vinylogs thereof, advantageously of not more than 12 carbon atoms.

Examples of alkylidene, are given above and examples of aramethylidene are furfurylidene, 5-methylfurfurylidene, benzylidene, m-tolylidene, o-tolylidene, p-tolylidene, o-chlorobenzylidene, m-chlorobenzylidene, m-bromobenzylidene, p-bromobenzylidene, p-methoxybenzylidene, m-methoxybenzylidene, o-methoxybenzylidene, 3,4-dimethoxybenzylidene, salicylylidene p-hydroxybenzylidene, 3,4,5-trimethoxybenzylidene, piperonylidene, o-nitrobenzylidene, p-chlorobenzylidene, m-nitrobenzylidene, p-nitrobenzylidene, $\beta$-naphthylidene, p-bromobenzylidene, o-bromobenzylidene, 2,4-dichlorobenzylidene, 3-methoxy-4-hydroxybenzylidene, terephthylidene, 3,4-dehydroxybenzylidene, and cinnamylidene.

The compounds of Formulas IA, IB, IIA, IIB, and V exist either in the protonated or non-protonated forms according to the pH of the environment. When the protonated form is intended the compound is qualified as an acid-addition salt and when the non-protonated form is intended it is qualified as a free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicyclic, 3-phenylsalicyclic, 5-phenylsalicyclic, 3-methylglutaric, orthosulfobenzoic, cyclopentanepropionic, 1,2-cyclohexanedicarboxylic, 4-cyclohexanecarboxylic, octadecenylsuccinic, octenylsuccinic, methanesulfonic benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octodecylsulfuric, picric, benzoic cinnamic, and like acids.

The acid-addition salts can be used for the same purposes as the free base or they can be employed to upgrade the same. For example, the free base can be converted to a water-insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate, and the aqueous solution of the salt extracted with various water-immiscible solvents before regenerating the free base form by treatment of the thus-extracted acid solution or converted to another salt by metathesis. The free bases of Formulas IA, IB, IIA, IIB, and V can be used as buffers or as antacids. The compounds of Formulas I, II, and V react with isocyanates to form urethanes and can be used to modify polyurethane resins. The long chain compounds, i.e., where $HR_2$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 2,122,536 and 3,122,552.

The close analogues of 7-halo-7-deoxylincomycin, i.e., where—$R_1H$ is cis or trans alkyl of not more than 8 carbon atoms; $R_3$ is methyl or ethyl; R is alky of not more than 8 carbon atoms; have antibacterial properties, and some are comparable or superior to lincomycin and can be used for the same purposes as lincomycin. The corresponding compounds where $R_3$ is hydrogen have like antibacterial properties and, moreover, have improved gram-negative activity. The other analogues and isomers have similar antibacterial properties but to a lesser degree and can be used for the same purposes as lincomycin where larger amounts are not objectionable.

The following examples are illustrative of the process and products of the present invention but are not to be construed as limiting. The parts and percentages are by weight and the solvent ratios are by volume unless otherwise specified.

EXAMPLE 1

7(S)-chloro-7-deoxylincomycin hydrochloride

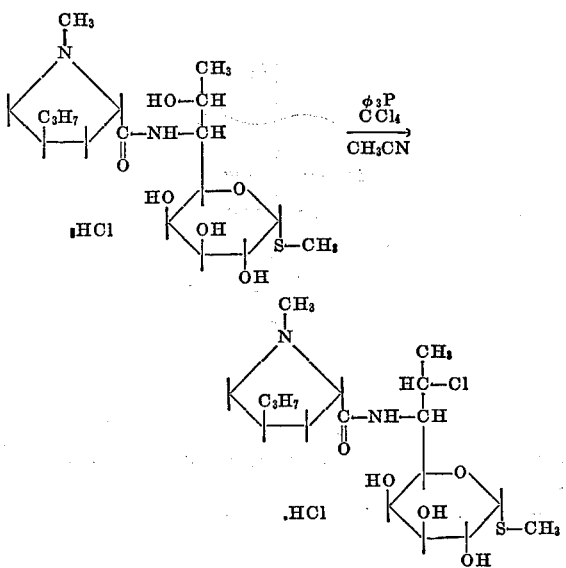

A solution of 50 g. of lincomycin hydrochloride, 120 g. of triphenylphsophine, and 500 ml. of acetonitrile in a 3 l. flask equipped with a stirrer was cooled in an ice bath and 500 ml. of carbon tetrachloride was added in one portion. The reaction mixture was then stirred for 18 hrs. without addition of ice to the cooling bath. The reaction was evaporated to dryness under vacuum on a 50–60° water bath, yielding a clear, pale yellow viscous oil. An equal volume of water was added and the mixture shaken until all of the oil was dissolved. The resulting suspension of white solid ($\phi_3$PO) was filtered through a sintered glass mat and discarded. The filtrate was adjusted to pH 11 by addition of 6 N aqueous sodium hydroxide. A solid precipitated. The resulting slurry was extracted with four 300 ml. portions of chloroform. The aqueous phase was discarded. The combined chloroform extract was washed once with 100 ml. of saturated aqueous sodium chloride solution and the sodium chloride phase was discarded. The chloroform phase was evaporated to dryness under vacuum on a 50–60° C. water bath and an equal volume of methanol was added to the residue and the resulting solution heated at reflux for 1 hr. The methanol solution was evaporated to dryness under vacuum on a 50–60° C. water bath. The residue was a clear pale yellow viscous oil. An equal volume of water and 10 ml. of 37% aqueous HCl was added and the resultant was shaken until the oil dissolved and a white solid (more $\phi_3$PO) remained in suspension. The suspension was filtered through a sintered glass mat at pH 1–2 and the solid discarded. The filtrate was extracted twice with 100 ml. of carbon tetrachloride. The carbon tetrachloride phase was discarded. The aqueous phase was adjusted to pH 11 by addition of 6 N aq. sodium hydroxide and extracted four times with 300 ml. portions of chloroform. The combined chloroform extract was washed three times with 100 ml. of saturated aq. sodium chloride solution and the sodium chloride phase was discarded. The chloroform extract was dried over anhydrous magnesium sulfate, filtered and the filtrate evaporated to dryness under vacuum on a 50–60° C. water bath. The residue was a clear, colorless glass weighing 45 g. analyzing about 95% 7(S)-chloro-7-deoxylincomycin. To the crude product there was added 100 ml. of ethanol with the warming until a clear solution was obtained. Then 150 ml. ethyl acetate was added and the resultant filtered through a glass mat and the filtrate adjusted to pH 1 by the addition of saturated ethanolic. HCl. Crystallization soon occurred. The resultant was allowed to stand at 0° C. for 18 hrs. and then filtered through a sintered glass mat. The solid was dried under vacuum at 60° C. for 18 hrs. yielding 35 g., a 67% yield of 7(S)-chloro-7-deoxylincomycin hydrochloride as an ethanol solvate. On recrystallization from aqueous acetone (7 ml. $H_2O$ to 300 ml. acetone) there was obtained an analytical sample having the following analysis:

*Analysis.*—Calcd. for $C_{18}H_{33}ClN_2O_5S \cdot HCl \cdot H_2O$: C, 45.18; H, 7.37; S, 6.70; $H_2O$, 3.77. Found: C, 45.09; H, 7.74; S, 6.45; $H_2O$, 4.24.

$[\alpha]_D^{H2O} +145$.

Activity: About 4 to 8 times lincomycin.
Antibacterial spectrum: Same as lincomycin.

EXAMPLE 2

7(S)-Iodo-7-deoxylincomycin hydrochloride

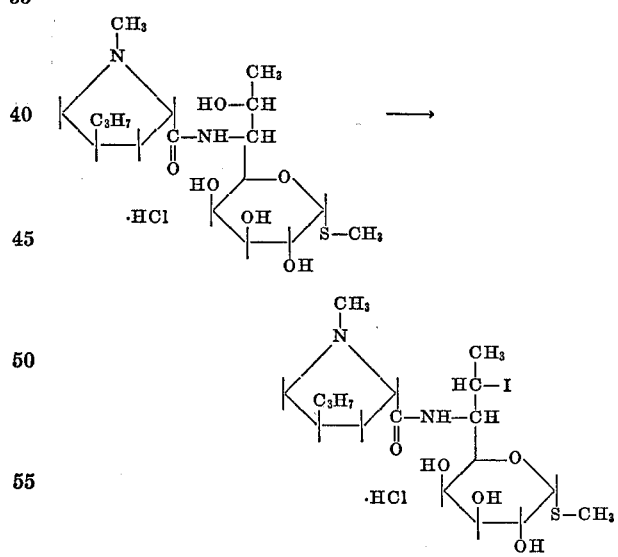

A solution of lincomycin·HCl (20 g., 0.045 mole), acetonitrile (200 ml.), carbon tetraiodide (100 g., 0.192 mole) and triphenylphosphine (51 g., 0.195 mole) was stirred at 25° for 18 hours, filtered and the filtrate evaporated to dryness under vacuum. The residual oil was shaken well with 1 liter of $CCl_4$ plus 1 liter of 0.1 N aqueous HCl solution. The aqueous phase was extracted with $CCl_4$, filtered, made basic (pH 11) by addition of 4 N aqueous NaOH solution, and then extracted with $CHCl_3$. The $CHCl_3$ extracts were combined and evaporated to dryness under vacuum to give 12.5 g. of 7(S)-iodo-7-deoxylincomycin hydrochloride as white solid. This material was purified by repeated chromatography over silica gel using a solvent system composed of $CHCl_3$: $CH_3OH$ (7:1 by volume) and converted to its hydrochloride salt and recrystallized from ethanol to give 100 mg., 0.5% yield, of 7(S)-iodo-7-deoxylincomycin hydrochloride as white crystals assaying 4 to 16 times as active as lincomycin.

EXAMPLE 3

On substituting the carbon tetrachloride of Example 1 by carbon tetrabromide, 7(S)-bromo-7-deoxylincomycin hydrobromide was obtained which was identical with an authentic sample.

EXAMPLE 4

Methyl 6-amino-7(S)-chloro-6,7,8-trideoxy-1-thio-L-threo-α-D-galacto-octopyranoside

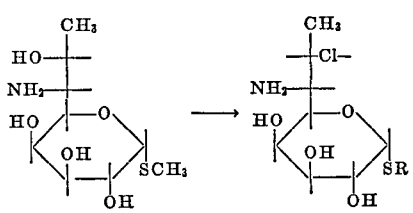

A mixture of 1.0 g. of methyl 6-amino-6,8-dideoxy-1-thio-D-erythro-α-D-galacto-octopyranoside, 3.0 g. of triphenylphosphine, 10 ml. of carbon tetrachloride, and 100 ml. of acetonitrile was heated at reflux for 3 hours. The reaction mixture was then evaporated to dryness under vacuum and the residue purified by chromatography over 500 g. of silica gel using a solvent system compound of chloroform and methanol (4:1). The product fractions (as determined by thin layer chromatography) were pooled and evaporated to yield a white solid which on recrystallization from ethanol yielded 250 mg. (23.3%) of methyl 6-amino-7(S)-chloro-6,7,8-trideoxy-1-threo-α-D-galacto-octopyranoside M.P. 169–172° C.

On substituting the carbon tetrachloride by carbon tetrabromide and carbon tetraiodide there were obtained 6-amino-7(S)-bromo- and 6-amino-7(S)-iodo-6,7,8 - trideoxy-1-thio-L-threo-α-D-galacto-octopyranosides.

On substituting the methyl 6-amino-6,8-dideoxy-1-thio-D-erythro-α-D-galacto - octopyranoside by ethyl, propyl, isopropyl, butyl and other alkyl 6-amino-6,8-dideoxy-1-thio-D-erythro-α-D-galacto-octopyranosides, (U.S. 3,316,-243), there are obtained the corresponding ethyl, propyl, isopropyl, butyl, other alkyl 6-amino-7(S)-chloro-, 6-amino-7-(S)-bromo, and 6-amino-7(S)-iodo - 6,7,8 - trideoxy-1-thio-L-threo-α-D-galacto-octopyranosides.

On substituting the lincomycin of Examples 1, 2, and 3 by methyl 6,8-dideoxy-6-(4-alkyl-L-2-pyrrolidinecarboxamido)-D-erythro-α-D-galacto - octopyranoside (Belgian Patent 667,948, Feb. 7, 1966; South African Patent 65/3,544, Mar. 29, 1967), there is obtained methyl 7-chloro, 7-bromo-, and 7-iodo-6,7,8-trideoxy-6(4-alkyl-L - 2 - pyrrolidinecarboxamido)-D-erythro-α-D-galacto - octopyranoside in which, alkyl is methyl, ethyl, propyl, butyl, pentyl, hexyl, heptyl, or octyl, and the isomeric forms thereof. By alkylating the pyrrolidine nitrogen either before or after the halogenation by the procedures given in Belgian Patent 667,948 or South African Patent 65/3,544 the corresponding 1-alkyl is methyl, ethyl, propyl, butyl, pentyl, hexyl, heptyl, or octyl, and the isomeric forms thereof.

All the above compounds can also be obtained in the 7(R) configuration by substituting the starting D-erythro compounds by the corresponding L-threo compounds. Preparation of the latter is described in Belgian Patent 667,948 and South African Patent 65/3,544 (U.S. Application 463,934, filed June 14, 1965) now U.S. Patent No. 3,380,992.

I claim:
1. The process of making compounds of the formula

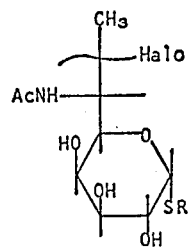

wherein R and Ac are as given below, the step of replacing the 7-hydroxy group with halogen by reacting a compound of the formula

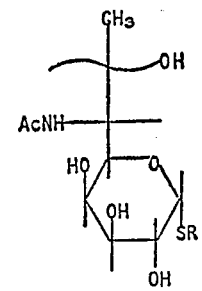

with triphenyl phosphine and carbon tetrahalide in an inert solvent wherein Ac is hydrogen or carboxylic acid acyl, R is the radical of a mercaptan, and Halo is chlorine, bromine, or iodine.

2. The process of making compounds of the formula

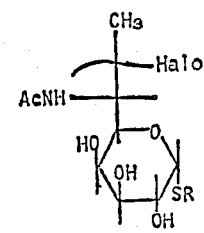

and esters and ethers thereof wherein R and Ac are as given below, the step of replacing the 7-hydroxy group with halogen by reacting a compound of the formula

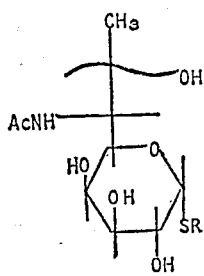

in which any or all of the 2-, 3-, and 4-position hydroxy groups can be in the form of esters or ethers, with triphenyl phosphine and carbon tetrahalide in an inert solvent wherein Ac is hydrogen or a 4-substituted-L-2-pyrrolidinecarboxylic acid acyl, R is the radical of a mercaptan, and Halo is chlorine, bromine, or iodine.

3. A process according to claim 2 wherein R is alkyl of not more than 20 carbon atoms and Ac is hydrogen or the acyl radical of a 4-substituted-L-2-pyrrolidinecarboxylic acid of the formula:

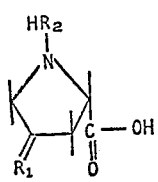 (A) and 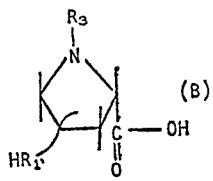 (B)

wherein $R_1$ and $R_2$ are alkylidene of not more than 20 carbon atoms, cycloalkylidene of from 3 to not more than 8 carbon atoms, and aralkylidene of not more than 12 carbon atoms; and $R_3$ is hydrogen or $HR_2$.

4. A process according to claim 3 wherein Ac is acyl as defined in claim 3.

5. A process according to claim 3 wherein Ac is hydrogen.

6. A process according to claim 2 wherein R is alkyl of not more than 20 carbon atoms and Ac is the acyl radical of a 4-substituted-L-2-pyrrolidinecarboxylic acid of the formula

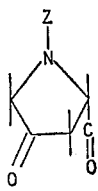 (C) 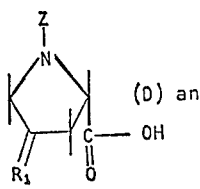 (D) and 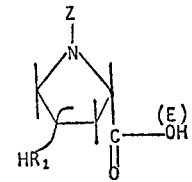 (E)

wherein $R_1$ is alkylidene of not more than 20 carbon atoms, cycloalkylidene of from 3 to not more than 8 carbon atoms, and aralkylidene of not more than 12 carbon atoms; and Z is a protective group removable by hydrogenolysis or solvolysis.

7. A process according to claim 6 in which Z is hydrocarbyl oxycarbonyl, trityl, diphenyl(p-methoxyphenyl)methyl, bis(p-methoxyphenyl)phenylmethyl, benzyl, or p-nitrobenzyl.

References Cited
UNITED STATES PATENTS
3,282,917  11/1966  Magerlein _____ 260—210

LEWIS GOTTS, Primary Examiner

JOHNNIE R. BROWN, Assistant Examiner

U.S. Cl. X.R.
195—80; 260—326.3

PO-1050
(5/69)

UNITED STATES PATENT OFFICE
CERTIFICATE OF CORRECTION

Patent No. 3,475,407                    Dated October 28, 1969

Inventor(s)       Robert D. Birkenmeyer

It is certified that error appears in the above-identified patent and that said Letters Patent are hereby corrected as shown below:

Column 2, line 69, change "aralylidene" to --aralkylidene--.
Column 4, line 75, change "n-nitrocarbobenzoxy" to --p-nitrocarbobenzoxy--. Column 5, line 62, change "obtain" to --obtained--. Column 6, line 61, change "N-Dimethyllincomycin" to --N-Demethyllincomycin--, line 66, change "α-MLT" to --α-MTL--. Column 7, line 9, change "3,086,812" to --3,086,912--. Column 8, line 3, change "licomycin" to --lincomycin--, line 4, change "lincompcin" to --lincomycin--, lines 21-22, change "the compound with" to --the compound to be converted with--. Column 10, line 16, change "XVII" to --XVI--. Column 11, line 20, change "dipopyl" to --dipropyl--, line 64, change "3,5 dinitrobenzoic" to --3,5-dinitrobenzoic--. Column 12, line 72, change "2,122,536" to --3,122,536--. Column 14, line 12, change "with the warming" to --with warming--.

SIGNED AND
SEALED
MAR 2 1971

(SEAL)
Attest:

Edward M. Fletcher, Jr.

WILLIAM E. SCHUYLER, JR.
Commissioner of Patents

PLD-170